(12) United States Patent
Nagata et al.

(10) Patent No.: US 7,186,026 B2
(45) Date of Patent: Mar. 6, 2007

(54) FOIL HYDRODYNAMIC JOURNAL BEARING AND METHOD OF MANUFACTURING THE SAME

(75) Inventors: Mari Nagata, Inuyama (JP); Minoru Hanahashi, Inuyama (JP); Kazuhiko Kawaike, Inuyama (JP)

(73) Assignee: Daido Metal Company, Ltd., Nagoya (JP)

( * ) Notice: Subject to any disclaimer, the term of this patent is extended or adjusted under 35 U.S.C. 154(b) by 140 days.

(21) Appl. No.: 11/079,775

(22) Filed: Mar. 15, 2005

(65) Prior Publication Data

US 2005/0201646 A1    Sep. 15, 2005

(30) Foreign Application Priority Data

Mar. 15, 2004  (JP)  .............................. 2004-073395
Jan. 20, 2005  (JP)  .............................. 2005-005720

(51) Int. Cl.
    *F16C 32/06*    (2006.01)
(52) U.S. Cl. ....................... 384/104; 384/106
(58) Field of Classification Search ........ 384/103–106, 384/119; 29/898.02
    See application file for complete search history.

(56) References Cited

U.S. PATENT DOCUMENTS 3,359,613 A * 12/1967 Rye .......................... 29/898.02

3,424,505 A * 1/1969 Pizzitola ..................... 384/119
4,170,389 A * 10/1979 Eshel .......................... 384/104
4,647,227 A * 3/1987 Clebant ....................... 384/99
5,114,244 A * 5/1992 Dunham et al. ............. 384/103
5,519,274 A * 5/1996 Scharrer ...................... 384/103

FOREIGN PATENT DOCUMENTS

JP          09-014262           1/1997

OTHER PUBLICATIONS

Dellacorte C. et al., "Load Capacity Estimation of Foil Air Journal Bearings for Oil-Free Turbomachinery Applications ©", Tribology Transactions, (2000), vol. 43, No. 4, pp. 795-801.

* cited by examiner

*Primary Examiner*—Thomas R. Hannon
(74) *Attorney, Agent, or Firm*—Browdy and Neimark, PLLC (57) ABSTRACT

A multi-lobe bearing is of simple construction such that a foil sheet in the form of a closed loop is arranged on a journal shaft by joining both ends of two sheets together, with a bearing gap therebetween and filling a viscoelastic body in an air gap between the foil sheet and an inside of a bearing holding member, whereby the bearing gap between the journal shaft and the foil sheet is configured to be liable to generate a fluid pressure. Also, the bearing is simply constructed to be made easy in assembly, and in particular, appropriate in bearing the journal shaft having a small diameter.

13 Claims, 8 Drawing Sheets

FOIL HYDRODYNAMIC JOURNAL BEARING AND METHOD OF MANUFACTURING THE SAME

TECHNICAL FIELD

The present invention relates to a foil hydrodynamic journal bearing, which comprises a bearing holding member enclosing an outer periphery of a journal shaft with an air gap therebetween, and a foil sheet arranged in the air gap to constitute a bearing sliding surface opposed to the journal shaft, and in which a fluid lubricating film formed by relative rotation between the journal shaft and the bearing sliding surface supports a load acting on the journal shaft, and a method of manufacturing the foil hydrodynamic journal bearing.

BACKGROUND OF THE INVENTION

There are examples, in which in place of conventional oil lubricating bearings, gas bearings are used as bearings for journal shafts of gas turbines, compressors, etc., which rotate at high speed. In the case where working temperature is high as in gas turbines, thermal expansion and thermal deformation are increased to cause a problem that hydrodynamic journal bearings, of which bearing surfaces opposed to a journal shaft are composed of rigid members and which include a tilting pad and a herringbone groove type hydrodynamic bearings, are hard in terms of reliability to be put to practical use. Therefore, there have been developed and adopted foil hydrodynamic journal bearings, of which bearing surfaces are composed of an elastically compliant foil sheet to be able to absorb thermal deformation, thermal expansion, manufacturing error, and assembly error of respective parts, etc.

In addition to the feature described above, foil hydrodynamic journal bearings are stable in high-speed rotation since they elastically support and damp a journal shaft. For example, the literature (TRIBOLOGY TRANSACTIONS, Vol. 43-4 (2000), pages 795–801) describes the historical development of foil hydrodynamic gas bearings.

According to the disclosure of the literature, foil hydrodynamic journal bearings are generally composed of bearing sliding surfaces and spring members, which elastically support the bearing sliding surfaces, and enhanced in bearing performance by an increase in flexibility and damping quality of the bearing. Such foil hydrodynamic journal bearings are mainly classified into leaf type ones and bump type ones according to the structure of spring members, which elastically support bearing sliding surfaces.

Leaf type foil hydrodynamic journal bearings comprise a plurality of leaf foils arranged round a journal shaft with a bearing gap therebetween in a manner to partially overlap one another on a bearing circle, and a non-cylindrical bearing shape obtained by overlapping of the foils is made use of to generate dynamic pressure upon rotation of the shaft. Also, as an axle load acts, the leaf foils are deformed in a manner to follow the journal shaft, and the bearing is enhanced in damping capacity by friction, which is caused by the deformation to act on the leaf foils, so that it is possible to expect an effect of reduction in rotational vibrations of a journal shaft.

On the other hand, bump type foil hydrodynamic journal bearings comprise a substantially circular-shaped top foil arranged round a journal shaft with a bearing gap therebetween, the top foil being elastically supported on a bearing holding member (housing) through a bump foil, which is formed to be corrugated in shape. When a load acts on the journal shaft, the top foil is deformed in a manner to follow the journal shaft, which causes strain on the bump foil and causes slip on contact surfaces between the top foil and the bump foil to give bearing damping by virtue of friction. Besides, multiple winding type foil hydrodynamic journal bearings have been also proposed.

Furthermore, in order to improve the bearing performance for rotational vibrations or the like, an improvement in stiffness and damping characteristics is made by providing an intermediate layer (mid-foil) to make a plurality of layers, as by means of a method of inserting a further foil between a top foil and an elastic support member (for example, a bump foil), and by contriving the shape and material of the elastic support member. However, foil hydrodynamic journal bearings having the above feature involve a problem that parts are large in number, precision machining is demanded in manufacture, and since handling is difficult to make, a minute work is made necessary at the time of mounting the parts in an assembly stage to be unsuitable for mass production.

Since in case of a lubricant being gaseous, a lubrication film formed between a bearing sliding surface and a journal shaft upon rotation is as small as several microns or less, minute irregularities are generated on the bearing sliding surface due to being discontinuously supported by a bump foil to make it hard to form an ideal wedge film shape, which constitutes a basis for formation of a lubrication film, with the result that the bearing loading capacity is lowered.

Hereupon, as in a hydrodynamic gas journal bearing described in JP-A-9-14262, there has been proposed an arrangement, in which a vibration damping material (vibration-proof rubber, macromolecular gel, or powder) is provided between a cylindrical-shaped foil and a bearing holding member (housing).

SUMMARY OF THE INVENTION

However, the foil hydrodynamic journal bearing described in JP-A-9-14262 has a disadvantage that it is difficult to set a minute bearing gap between the foil and a journal shaft. Also, since the cylindrical-shaped foil serving as a bearing sliding surface can be supported continuously, it is favorable that deformation of minute irregularities is hard to be generated on the sliding surface, but there is a disadvantage that the wedge shape of a lubrication film is hard to be formed since the lubrication film on those portions, in which ribs are present, tends to become thin and wear particle generated on the sliding surface is hard to be discharged from the sliding surface since the bearing sliding surface is cylindrical-shaped.

The invention has been thought of in view of the situation described above, and has its object to provide a foil hydrodynamic journal bearing having a construction, in which a wedge-shaped lubrication film making a fundamental of formation of a lubrication film is easy to form and has a large bearing loading capability, wear particle generated by direct contact of a journal shaft and a bearing sliding surface at the time of starting or stoppage is liable to be discharged from the bearing sliding surface, a minute bearing gap can be readily set at the time of manufacture, and manufacture and assembly are simple, and a method of manufacturing the foil hydrodynamic journal bearing.

In order to attain the above object, in one aspect of the invention, there is provided a foil hydrodynamic journal bearing comprising a bearing holding member enclosing an outer periphery of a journal shaft with an air gap there between, and a foil sheet arranged in the air gap to constitute a bearing sliding surface opposed to the journal shaft in operation, wherein a fluid lubricating film formed by relative rotation between the journal shaft and the bearing sliding surface supports a load acting on the journal shaft; the foil sheet comprises a closed loop including one or plural tops and bulged arcuate surfaces corresponding in number to the tops; and a viscoelastic body or an elastic body is filled in the air gap between the foil sheet and the bearing holding member.

In the above aspect of the invention, since the foil sheet comprises a closed loop including one or plural tops and the bearing gap between the foil sheet and the journal shaft is wedge-shaped to continuously converge toward the gap near to a substantially central position of the bulged arcuate surface from the gap near to the top, a fluid (containing gases) is drawn from the gap in the vicinity of the top upon rotation of the journal shaft to generate a fluid pressure toward the gap of a converging shape, and at or in excess of a specific rotational speed, a complete fluid lubrication film is formed to enable the journal shaft to float, thus enabling enhancing the loading capacity for bearing of a load of a rotating equipment acting on the journal shaft. Also, since the foil sheet defining the bearing sliding surface includes slack on the top or tops of the foil sheet, it can decrease a light contact with the journal shaft and an allowable error of the bearing gap is large to enable easily setting the bearing gap. Also, a vibrational load such as unbalance, etc., which accompanies rotation, is supported and damped by reaction forces and damping forces of the fluid lubrication film generated in the bearing gap and the viscoelastic body, which is effective in realizing stable rotation with small vibrations. Furthermore, since the construction is such that wear particle generated on the bearing sliding surface by direct contact of the journal shaft and the bearing sliding surface at the time of starting or stoppage is liable to be discharged to the large gap in the vicinity of the top or tops, it is possible to maintain a stable bearing performance over a long term.

According to an embodiment of the invention, the foil hydrodynamic journal bearing is constructed such that the foil sheet is arranged in the air gap and the viscoelastic body (or an elastic body) is filled so as to prevent direct contact between the top or tops of the foil sheet and the inner peripheral surface of the bearing holding member.

According to this embodiment, since the gap is defined so as to prevent direct contact between the top or tops of the foil sheet and the inner peripheral surface of the bearing holding member, the whole outer peripheral surface including the top or tops of the foil sheet and the bulged arcuate surface is supported by the viscoelastic body (or an elastic body) having the elastic effect, whereby reaction forces and damping forces for rotational vibrations can be enhanced to improve the bearing performance.

According to a further embodiment of the invention, the foil hydrodynamic journal bearing is constructed such that a notch slit is formed in the bearing holding member, the top or tops of the foil sheet are inserted into the notch slit, and the foil sheet is arranged in the air gap and the viscoelastic body (or an elastic body) is filled so as to prevent direct contact between the top or tops of the foil sheet and a bottom surface of the notch slit.

According to this embodiment, since the notch slit is formed in the bearing holding member, the top or tops of the foil sheet are inserted into the notch slit, and the gap is formed so as to prevent direct contact between the top or tops of the foil sheet and the bottom surface of the notch slit, the whole outer peripheral surface except the top or tops of the foil sheet is supported by the viscoelastic body (or an elastic body) having the elastic effect and the gap affords elastic displacement of the top or tops of the foil sheet, whereby reaction forces and damping forces for rotational vibrations can be enhanced to improve the bearing performance.

According to a still further embodiment of the invention, the foil hydrodynamic journal bearing is constructed such that an outer peripheral surface of the foil sheet is subjected to pretreatment to be improved in adhesiveness to the viscoelastic body (or an elastic body).

According to this embodiment, an outer peripheral surface of the foil sheet is subjected to pretreatment to be improved in adhesiveness to the viscoelastic body (or an elastic body) whereby it is possible to prevent occurrence of unstable vibrations of the journal shaft, for which vibration of membrane of the foil sheet itself generated at the time of high-speed rotation is responsible, and seizure of the journal shaft and the foil sheet in a state of high-speed rotation.

According to a further embodiment of the invention, the foil hydrodynamic journal bearing is constructed such that an inner peripheral surface of the bearing holding member is subjected to pretreatment to be improved in adhesiveness to the viscoelastic body (or an elastic body).

According to this embodiment, an inner peripheral surface of the bearing holding member is subjected to pretreatment to be improved in adhesiveness to the viscoelastic body (or an elastic body) whereby it is possible to prevent rotation of the foil sheet or the viscoelastic body (or an elastic body) together with the journal shaft rotation.

According to a still further embodiment of the invention, the foil hydrodynamic journal bearing is constructed such that one or both of an inner peripheral surface of the foil sheet and the journal shaft are coated with a lubricant, or a hard material, or a material.

According to this embodiment, one or both of an inner peripheral surface of the foil sheet and the journal shaft are coated with a lubricant, or a hard material, or a soft material, so that it is possible to decrease friction and wear between the foil sheet and the journal shaft at the time of starting, stoppage, or low-speed rotation when full fluid film is not formed yet.

According to a further embodiment of the invention, the foil hydrodynamic journal bearing is constructed such that an elastic region positioned on a fluid inlet side, through which a fluid constituting the fluid lubricating film is drawn into a gap between the journal shaft and the bearing sliding surface and which is formed by the viscoelastic body (or an elastic body), is smaller in elastic modulus than an elastic region positioned on a fluid outlet side, from which the drawn fluid is discharged and which is formed by the viscoelastic body (or an elastic body).

According to this embodiment, an elastic region (flexible region) positioned on a fluid inlet side, through which a fluid constituting the fluid lubricating film is drawn into a gap between the journal shaft and the bearing sliding surface and which is formed by the viscoelastic body (or an elastic body), is smaller in elastic modulus than an elastic region (less flexible region) positioned on a fluid outlet side, from which the drawn fluid is discharged and which is formed by the viscoelastic body (or an elastic body), so that deformation is liable to occur in the flexible region but hard to occur in the less flexible region. Thereby, the flexible region is enhanced in flexibility, so that the gap converges in shape from the fluid inlet side to the fluid outlet side to enable promoting generation of a wedge-shaped lubrication film.

According to a still further embodiment of the invention, the foil hydrodynamic journal bearing is constructed such that a top foil sheet or sheets corresponding in number to the tops are arranged between the foil sheet and the journal shaft, and the top foil sheet or sheets have one end or ends thereof formed as a fixed end or ends fixed to the top or tops of the foil sheet and the other end or ends thereof formed as a free end or ends not fixed so as to surround the journal shaft in the same direction as a direction of rotation of the journal shaft.

According to this embodiment, the top foil sheet or sheets having one end or ends thereof fixed and the other end or ends thereof made free so as to surround the journal shaft in the direction of rotation of the journal shaft are arranged between the foil sheet and the journal shaft. In this manner, since the top foil sheet or sheets are made free at one end or ends thereof, the top foil sheet or sheets are enhanced in flexibility, and when the journal shaft rotates, the top foil sheet or sheets are deformed following the rotation of the journal shaft, so that the gap converges in shape from the gap to the gap to enable generation of a wedge-shaped lubrication film. Also, since vibrational energy generated by the rotation of the journal shaft is converted into energy of Coulomb's friction caused between the top foil sheet or sheets and the foil sheet, it is possible to damp vibrations generated by the rotation of the journal shaft.

According to a further embodiment of the invention, the foil hydrodynamic journal bearing is constructed such that a single or plural shaft grooves are formed circumferentially on a surface of the journal shaft opposed to the bearing sliding surface, and the single or plural shaft grooves are communicated to the outside air through a gap formed in the vicinity of the top or tops.

According to this embodiment, in the case where the journal shaft formed with the shaft groove or grooves is supported by a single foil hydrodynamic journal bearing, even when the journal shaft tilts, pressure as generated is divided by the shaft groove or grooves to become the same as that at ends of the foil hydrodynamic journal bearing to present such pressure distributions as that in case of using a plurality of foil hydrodynamic journal bearings since the shaft groove or grooves are communicated to the outside air through the gap. Thereby, a bearing moment load found from the product of a distance from the center of the bearing and the pressure distribution is increased, and so it is possible to restrict tilting of the journal shaft.

According to a still further embodiment of the invention, the foil hydrodynamic journal bearing is used as a journal bearing for magnetic-disk drive motors, polygon mirror scanner motors, or color-wheel motors for rear projection televisions.

According to this embodiment, in the case where the foil hydrodynamic journal bearing according to the invention is used as a journal bearing for magnetic-disk drive motors, polygon mirror scanner motors, or color-wheel motors for rear projection televisions, it is possible to dissolve of leakage and mist of a lubricating oil, irregular vibrations caused by occurrence of cavitation, an increase in bearing loss (power consumption), etc. in high-speed rotation with the rotational speed being 10,000 rpm or more, which are problematic in conventional oil-lubricated bearings.

In a further aspect of the invention, there is provided a method of manufacturing a foil hydrodynamic journal bearing, the method comprising: a first step of joining overlapped end sides of one or plural flat sheets together to manufacture the foil sheet of a closed loop having one or plural tops and a surface or surfaces corresponding in number to the tops; a second step of using an assembly jig, which comprises a shaft column copying the journal shaft and provided upright centrally of a base board, on which positioning means (recess) corresponding in external size to the bearing holding member is formed, to insert the shaft column through an inner loop space defined by the foil sheet of a closed loop, which is manufactured in the first step, to form a bulged arcuate surface; a third step of mounting and inserting the bearing holding member into the recess on the base board of the assembly jig; a fourth step of filling a viscoelastic body (or an elastic body) in the air gap between the foil sheet and the bearing holding member to dry the same; and a fifth step of removing the foil hydrodynamic journal bearing from the assembly jig.

Furthermore, according to a further aspect of the invention, it is possible to provide a manufacturing method, by which a foil hydrodynamic journal bearing according to the invention can be manufactured only by mounting a foil sheet of a closed loop, which is formed by joining overlapped end sides of a flat sheet or sheets to include a single or a plurality of tops and a surface or surfaces corresponding in number to the tops, and a bearing holding member on an assembly jig, filling a viscoelastic body (or an elastic body) into an air gap between the foil sheet or sheets and the bearing holding member, thereafter drying the viscoelastic body, and removing the foil hydrodynamic journal bearing from the assembly jig, and which is simple in manufacture and assembly of a foil sheet or sheets, can manufacture a foil hydrodynamic journal bearing of exceedingly high accuracy, and is suited to mass production.

DETAILED DESCRIPTION OF THE INVENTION

Figure 1:
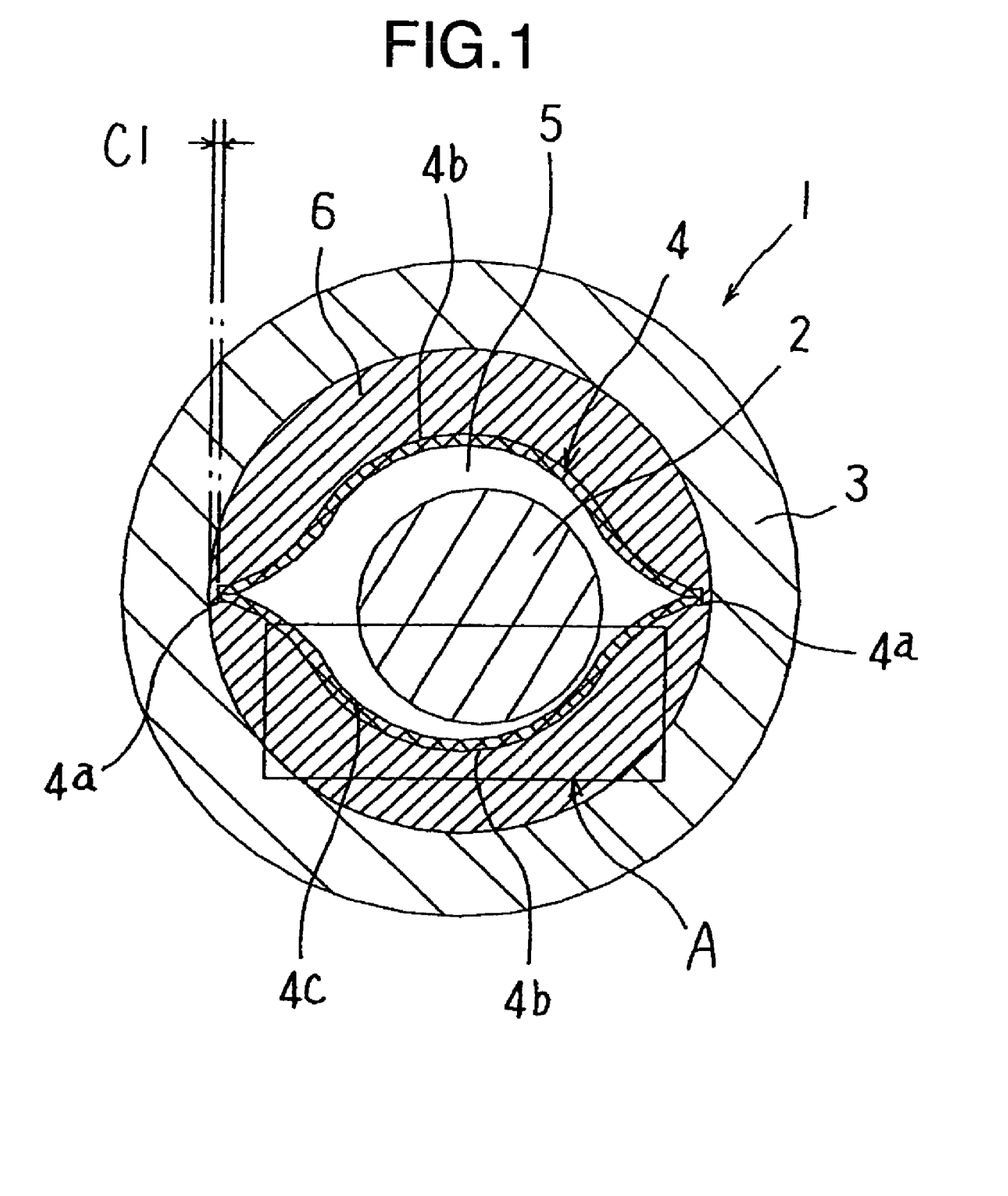
FIG. 1 is a cross sectional view showing a foil hydrodynamic journal bearing according to a first embodiment.

Preferred embodiments of the invention will be described below with reference to the drawings. FIG. 1 is a cross sectional view showing a foil hydrodynamic journal bearing 1 according to a first embodiment, FIG. 2 is an enlarged view showing a part A enclosed by a rectangle in FIG. 1, and FIG. 3 is a cross sectional view showing a foil hydrodynamic journal bearing 1 according to a modification of the first embodiment.

The first embodiment provides a foil hydrodynamic journal bearing 1, in which tops 4a and bulged arcuate surfaces 4b, respectively, comprise two foil sheets 4. In FIG. 1, the foil hydrodynamic journal bearing 1 comprises a bearing holding member 3 enclosing an outer periphery of a journal shaft 2 with an air gap there between, the foil sheets 4 arranged in the air gap to constitute bearing sliding surfaces opposed to the journal shaft 2, and a viscoelastic body 6 filled in the air gap between the bearing holding member 3 and the foil sheets 4.

With respect to the air gap, at the time of rest of operation a light contact is allowed partially between the foil sheet and the journal shaft with minimized air gap in order to form stiff lubricant film in operation. The foil sheets 4 are structured as a closed loop having the two tops 4a and the two bulged arcuate surfaces 4b. That is, the foil sheets 4 are formed by overlapping two flat rectangular sheets together, joining both end sides of the sheets by welding such as spot, seam, laser, or the like, or means such as adhesives, brazing, diffusion bonding, or the like, and using an assembly jig 10, described later, to structure a closed loop having the two tops 4a (the tops being constituted by joints) and the two bulged arcuate surfaces 4b. In this case, gaps C1 (several hundreds μm) are present between the tops 4a of the foil sheets 4 positioned most distant from a center of the journal shaft 2, and the bearing holding member 3, and the viscoelastic body 6 is also filled in the gaps C1. That is, the foil sheets 4 are not put in a state of being constrained by the bearing holding member 3. In addition, used for the foil sheets 4 are metallic sheets of stainless steel, phosphor bronze, brass, copper, aluminum, etc., or resin sheets of PTFE (polytetrafluoroethylene), the sheets having a thickness of 10 to 100 μm. In addition, in manufacture of the foil sheets 4 in the first embodiment, instead of using two sheets, a closed loop having the two tops 4a and the two bulged arcuate surfaces 4b may be structured by bending a single sheet and joining the bent portion and sides, respectively. Here, silicone, acrylic, or the like rubber material, or macromolecular gel is used as a viscoelastic body, and springs and a corrugated foil are used as an elastic body. In this case, a composite comprising a combination of these viscoelastic body and elastic body may be used.

Figure 2:
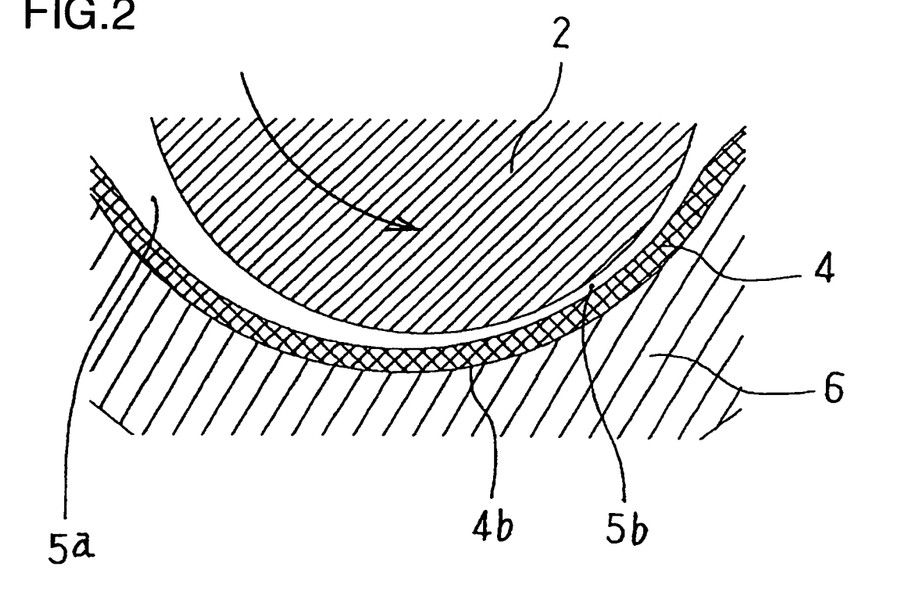
FIG. 2 is an enlarged view showing a part A enclosed by a rectangle in a FIG. 1.
Figure 3:
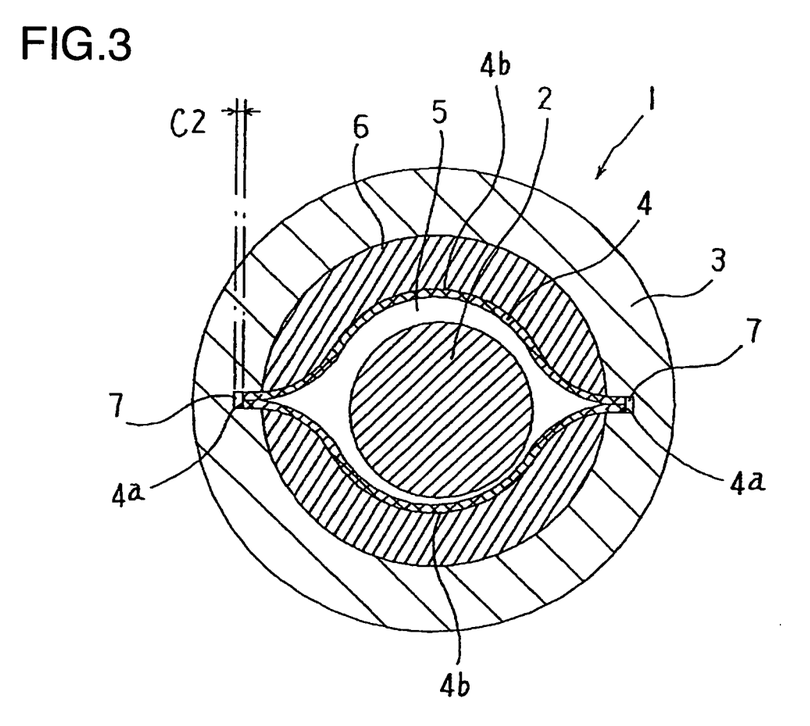
FIG. 3 is a cross sectional view showing a foil hydrodynamic journal bearing according to a modification of the first embodiment.

Also, when the journal shaft 2 is supported by the foil hydrodynamic journal bearing 1, a predetermined bearing gap 5 (generally, several μm or less) is provided between the journal shaft 2 and the foil sheets 4, and the gap 5 is distributed such that a gap 5a in the vicinity of the top 4a is largest and a gap 5b disposed on a substantially intermediate portion of the two tops is smallest as shown in FIG. 2. In addition, the journal shaft 2 and the foil sheets 4 contact with each other in a position of the gap 5b on the intermediate portion at the time of rest. Also, it is general to design the bearing gap 5 so that the smallest gap 5b is sized to amount to about 3/1000 or less of a diameter of the journal shaft 2. In addition, in order to decrease rotational vibrations of the journal shaft 2, it is preferred that the bearing gap 5 be set to a small magnitude. With the foil hydrodynamic journal bearing 1 according to the invention, even in a state, in which the bearing gap 5 is little present at the time of rest, the elastic effect produced by the foil sheets 4 and the viscoelastic body 6, which supports the foil sheets, forms a fluid lubrication film over a certain rotational speed to be able to float the journal shaft 2. In addition, a thickness of the foil sheets 4 and the bearing gap 5 are shown exaggeratingly in FIGS. 1 to 9 for the sake of better understanding. The bearing gap 5 is actually 10 μm at most.

The operation of the foil hydrodynamic journal bearing 1 constructed in the above manner will be described. When the journal shaft 2 rotates, a fluid is drawn in from the vicinity of the gap 5a close to the top 4a to generate a fluid pressure toward the gap 5b having a converging gap shape to support that load of a rotating equipment, which acts on the journal shaft 2. A vibrational load, such as unbalance, etc., which accompanies rotation, is supported and damped by reaction forces and damping forces of a fluid lubrication film generated in the gap 5 and the viscoelastic body 6, so that it is possible to realize stable rotation with small vibrations. Since the gaps C1 are formed so as to eliminate direct contact between the tops 4a of the foil sheets 4 and an inner peripheral surface of the bearing holding member 3, the whole outer peripheral surface including the tops 4a of the foil sheets 4 and the bulged arcuate surfaces 4b is supported by the viscoelastic body 6 having the elastic effect, whereby reaction forces and damping forces for rotational vibrations can be enhanced to improve the bearing performance.

The embodiment has a feature in that the foil sheets 4 are composed of a closed loop having the tops 4a to define a plurality of tops. The tops 4a have a large stiffness so that when a dynamic load acts on the bulged arcuate surface 4b serving as a bearing sliding surface, and even when the bearing sliding surface in the direction of action is displaced, the foil sheets 4 are deformed, due to a curved beam effect, in the vicinity of an arcuate surface 4c in a intermediate position between substantially a center of the bulged arcuate surface 4b and the top 4a. At this time, since the other bulged arcuate surface 4b is little influenced, it is possible to ensure rigidity of the foil hydrodynamic journal bearing 1. Furthermore, owing to the feature described above, the gap 5 between the journal shaft 2 and the foil sheets 4 is wedge-shaped to converge in a direction of rotation, which is liable to generate a fluid pressure, in the embodiment.

Figure 4A:
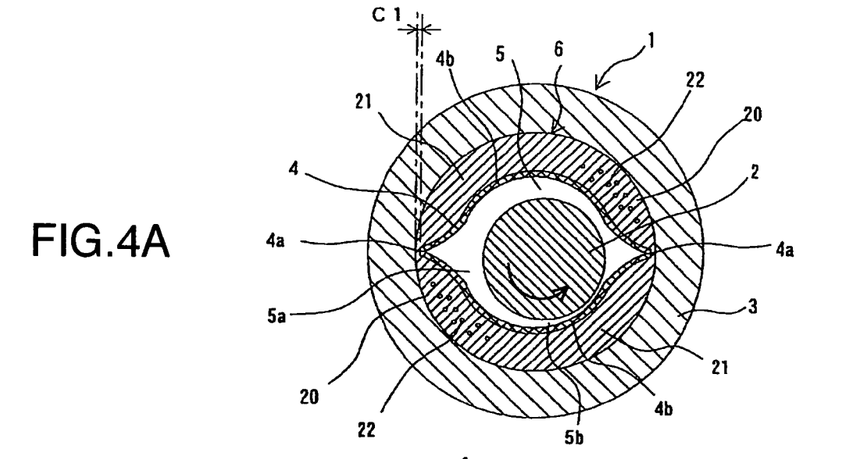
FIG. 4A is a cross sectional view showing a foil hydrodynamic journal bearing, in which holes are formed on sides of fluid inlets for a viscoelastic body.
Figure 4B:
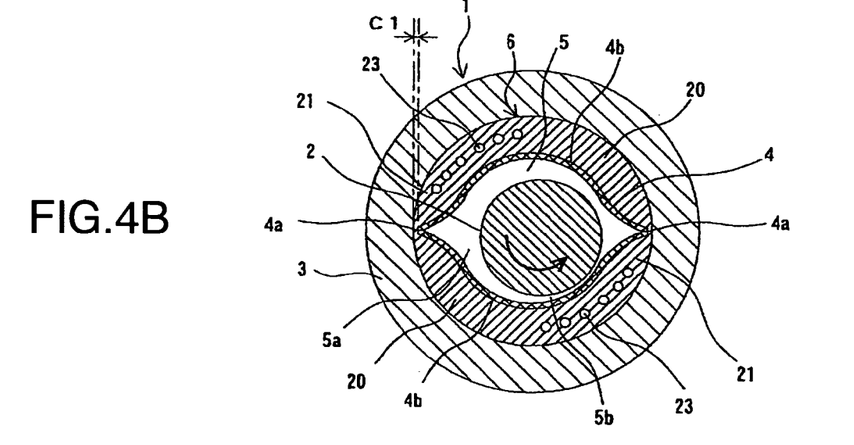
FIG. 4B is a cross sectional view showing a foil hydrodynamic journal bearing, in which solid bodies are inserted on sides of fluid outlets for the viscoelastic body.
Figure 4C:
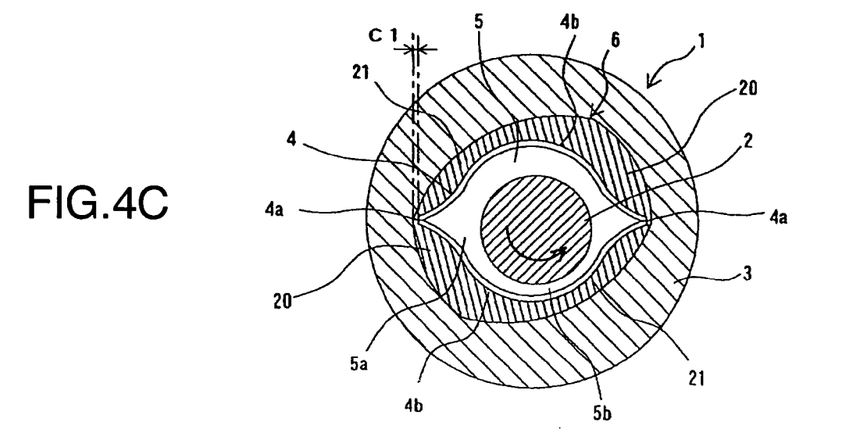
FIG. 4C is a cross sectional view showing a foil hydrodynamic journal bearing, in which a viscoelastic body filled on sides of the fluid inlets is larger in quantity than a viscoelastic body filled on sides of fluid outlets.
Figure 5:
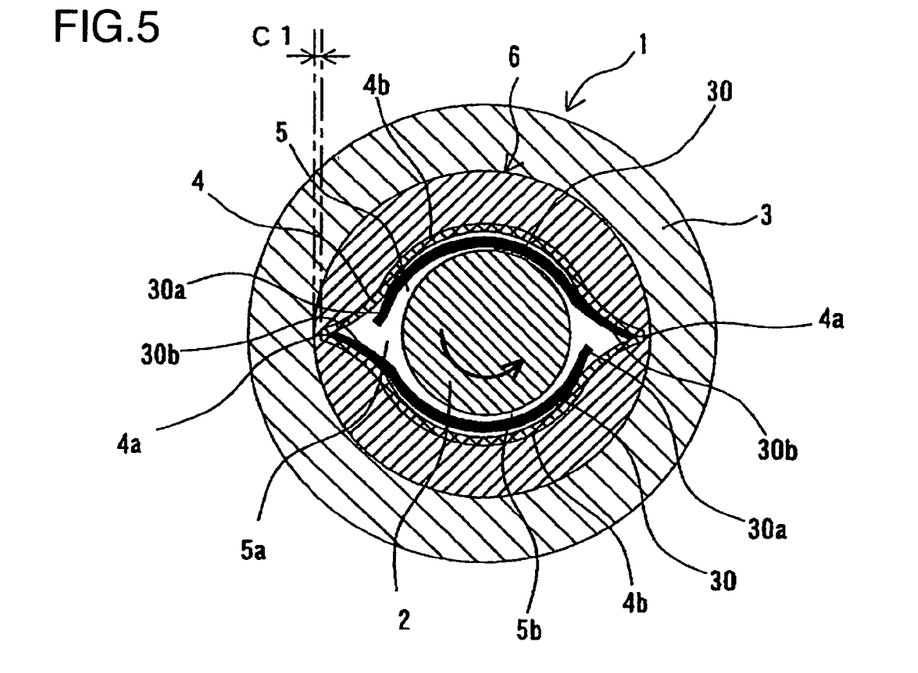
FIG. 5 is a cross sectional view showing a foil hydrodynamic journal bearing, in which top foil sheets are provided between foil sheets and a journal shaft.

A method of forming a further favorable wedge shape will be described with reference to FIGS. 4A to 4C and 5. FIG. 4A is a cross sectional view showing a foil hydrodynamic journal bearing 1, in which holes 22 are formed on sides of fluid inlets (the gap 5a) for the viscoelastic body 6. FIG. 4B is a cross sectional view showing a foil hydrodynamic journal bearing 1, in which solid bodies 23 are inserted on sides of fluid outlets (the gap 5b) for the viscoelastic body 6. FIG. 4C is a cross sectional view showing a foil hydrodynamic journal bearing 1, in which the viscoelastic body 6 filled on the sides of the fluid inlets (the gap 5a) is larger in quantity than the viscoelastic body 6 filled on the sides of the fluid outlets (the gap 5b). FIG. 5 is a cross sectional view showing a foil hydrodynamic journal bearing 1, in which top foil sheets 30 are provided between the foil sheets 4 and the journal shaft 2.

With the foil hydrodynamic journal bearing 1 shown in FIG. 4A, a plurality (10 on one side in the figure) of the holes 22 are formed in flexible regions 20 defined by the viscoelastic body 6 positioned on the side of the gap 5a (fluid inlets), into which a fluid is drawn when the journal shaft 2 rotates in a direction shown in the figure. Therefore, the flexible regions 20 are smaller in elastic modulus than the less flexible regions 21 defined by the viscoelastic body 6 positioned on the side of the gap 5b (fluid outlets), from which a fluid is discharged. In addition, in manufacturing the foil hydrodynamic journal bearing 1 shown in FIG. 4A, pins are provided upright in those positions on a base board 11 of the assembly jig 10 described later, which correspond to the holes 22, whereby the holes 22 are formed in the viscoelastic body 6 disposed in the flexible regions 20 when the foil hydrodynamic journal bearing 1 is taken out from the assembly jig 10.

With the foil hydrodynamic journal bearing 1 shown in FIG. 4B, a plurality (6 on one side in the figure) of the solid bodies 23 are inserted in the viscoelastic body 6 disposed in the flexible regions 20. The solid bodies 23 are formed from a material having a higher hardness than that of the viscoelastic body 6. Therefore, the flexible regions 20 are smaller in elastic modulus than the less flexible regions 21 in the same manner as described above. In addition, in manufacturing the foil hydrodynamic journal bearing 1 shown in FIG. 4B, the less flexible regions 21 are formed by inserting the solid bodies 23 in the viscoelastic body 6 disposed in the less flexible regions 21, which is filled in the gap between the bearing holding member 3 and the foil sheets 4.

With the foil hydrodynamic journal bearing 1 shown in FIG. 4C, the viscoelastic body 6 filled in the flexible regions 20 is larger in quantity than the viscoelastic body 6 filled in the less flexible regions 21, and is formed to have a large thickness in a radial direction of the foil hydrodynamic journal bearing 1. Therefore, the viscoelastic body 6 disposed in the flexible regions 20 is smaller in elastic modulus than the viscoelastic body 6 disposed in the less flexible regions 21 in the same manner as described above. In addition, unlike the constructions shown in FIGS. 4A and 4B, in this case, the flexible regions 20 and the less flexible regions 21 are made different from each other because the viscoelastic body 6 is different in filled quantity therebetween, so that strictly stated, the flexible regions 20 and the less flexible regions 21 are not different in elastic modulus from each other but the flexible regions 20 and the less flexible regions 21 are different in elastic deformation from each other.

As described above, since with all the constructions shown in FIGS. 4A to 4C, the flexible regions 20 are smaller in elastic modulus (elastic deformation in the construction shown in FIG. 4C) than the less flexible regions 21, the flexible regions 20 on the sides of the fluid inlets are susceptible to deformation and the less flexible regions 21 on the sides of the fluid outlets are hard to be deformed. Thereby, the flexible regions 20 are enhanced in flexibility, so that the gap converges in shape from the fluid inlets to the fluid outlets, thus enabling promoting generation of a wedge-shaped lubrication film.

In addition, a method of varying elastic modulus in the flexible regions 20 and the less flexible regions 21 may comprise, in addition to ones described above, for example, mixing metal powder, etc. with the viscoelastic body 6 in a manner to make the mixing ratio low in the flexible regions 20 and high in the less flexible regions 21.

Subsequently, the foil hydrodynamic journal bearing 1 shown in FIG. 5 will be described. With the foil hydrodynamic journal bearing 1 shown in FIG. 5, two top foil sheets 30 are provided between the foil sheets 4 and the journal shaft 2. The top foil sheets 30 have one ends thereof formed as fixed ends 30b fixed to the tops 4a of the foil sheets 4 and the other ends thereof formed as free ends 30a not fixed so that the top foil sheets surround the journal shaft 2 in the same direction as the direction of rotation of the journal shaft 2. In this manner, the top foil sheets 30 are enhanced in flexibility since the one ends thereof are free, and when the journal shaft 2 rotates, the top foil sheets 30 are deformed following the rotation of the journal shaft 2, so that the gap converges in shape from the gap 5a to the gap 5b to enable promoting generation of a wedge-shaped lubrication film. Also, since vibrational energy generated by the rotation of the journal shaft 2 is converted into energy of Coulomb's friction caused between the top foil sheets 30 and the foil sheets 4, it is possible to damp vibrations generated by the rotation of the journal shaft 2.

In addition, in manufacturing the foil hydrodynamic journal bearing 1 shown in FIG. 5, the journal bearing is formed by means of the assembly jig 10 described later, after two overlapped top foil sheets 30 are interposed between and overlapped on two foil sheets 4 and both ends of the overlapped sheets are joined together by the method described above. At this time, the top foil sheets 30 having a somewhat smaller length than that of the foil sheets 4 are used, and only one ends thereof are interposed between two foil sheets 4 to be joined together. The two top foil sheets 30 have opposite ends thereof interposed between and joined to the two foil sheets 4. Accordingly, a total of four sheets composed of the two top foil sheets 30 and the two foil sheets 4 overlap together but a total of three sheets composed of a single top foil sheet 30 and the two foil sheets 4 are joined together at joints on both ends.

While the gaps C1 are present between the tops 4a of the foil sheets 4 and the inner peripheral surface of the bearing holding member 3 in the embodiments shown in FIGS. 1, 2, 4A to 4C, and 5, positioning may be made sure by beforehand providing notched slits 7 on the bearing holding member 3 and mounting the tops 4a of the foil sheets 4 in the notched slits 7 as shown in FIG. 3. Also, in this case, it is desired that gaps C2 be formed between the tops 4a of the foil sheets 4 and bottom surfaces of the notched slits 7 to prevent the foil sheets 4 from being constrained by the bearing holding member 3. In addition, the embodiment shown in FIG. 3 constitutes a modification of the first embodiment to comprise two tops 4a of foil sheets 4 and two bulged arcuate surfaces 4b, and is different, as described above, from the first embodiment only in that the tops 4a are mounted and inserted into the notched slits 7 formed in the bearing holding member 3 but is the same in operation as the first embodiment. Also, with this modification, the tops 4a may be mounted and inserted into the notched slits 7 in a state of being joined together by means of welding or an adhesive, or may be mounted and inserted into the notched slits 7 without joining of sides of the foil sheets 4. Also, the viscoelastic body 6 may be, or may not be filled into the gaps C2 between the tops 4a of the foil sheets 4 and the bottom surfaces of the notched slits 7.

Figure 6:
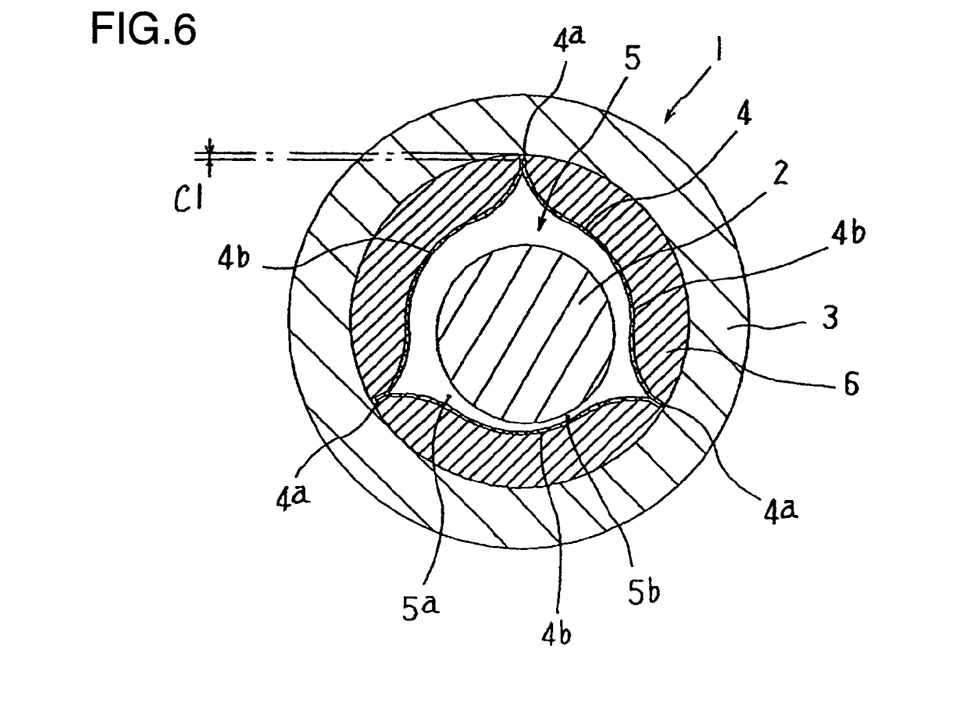
FIG. 6 is a cross sectional view showing a foil hydrodynamic journal bearing according to a second embodiment.
Figure 7:
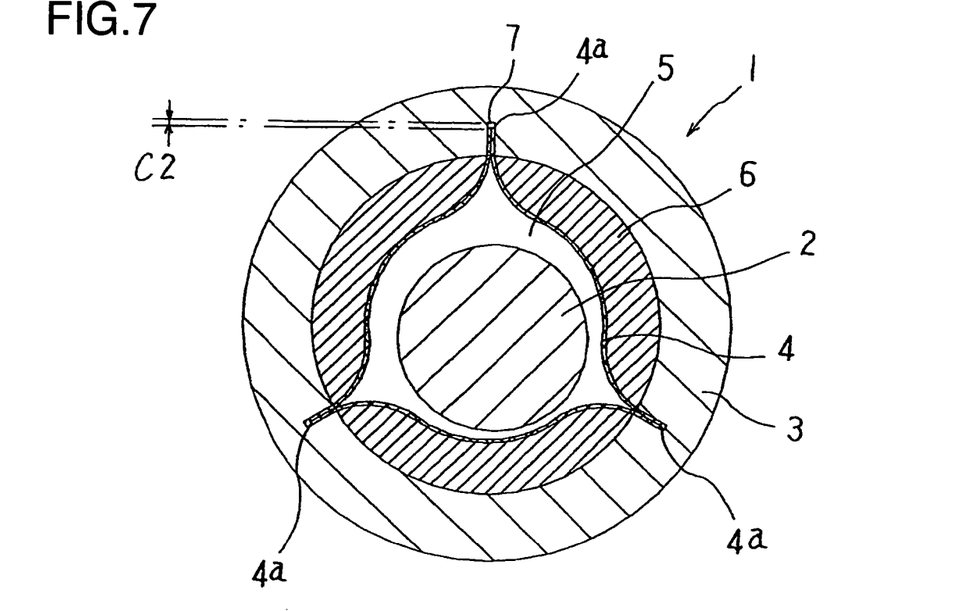
FIG. 7 is a cross sectional view showing a foil hydrodynamic journal bearing according to a modification of the second embodiment.

While the embodiments shown in FIGS. 1 to 5 have been described with respect to the foil hydrodynamic journal bearing 1, in which the tops 4a and the bulged arcuate surfaces 4b, respectively, comprise two foil sheets 4, a foil hydrodynamic journal bearing 1 (referred below to as "second embodiment"), in which the tops 4a and bulged arcuate surfaces 4b, respectively, comprise three foil sheets 4, will do. FIG. 6 is a cross sectional view showing a foil hydrodynamic journal bearing 1 according to a second embodiment, and FIG. 7 is a cross sectional view showing a modification of the second embodiment. The second embodiment will be simply described below. In addition, an explanation will be given below, in which the same members as those in the first embodiment are denoted by the same reference numerals as those in the latter.

The foil hydrodynamic journal bearing 1 according to the second embodiment also comprises a bearing holding member 3 enclosing an outer periphery of a journal shaft 2 with an air gap therebetween, foil sheets 4 arranged in the air gap to constitute bearing sliding surfaces opposed to the journal shaft 2, and a viscoelastic body 6 filled in the air gap between the bearing holding member 3 and the foil sheets 4.

The foil sheets 4 are structured as a closed loop having three tops 4a and three bulged arcuate surfaces 4b. That is, the foil sheets 4 are formed by overlapping respective end sides of three flat rectangular sheets together, joining the respective end sides together as by welding such as spot, seam, laser, or the like, or means such as adhesives, brazing, diffusion bonding, or the like, to make a triangular prism having concavely curved surfaces, and using an assembly jig 10, described later, to structure a closed loop having three tops 4a (the tops being constituted by joints) and three bulged arcuate surfaces 4b. In this case, gaps C1 (several hundreds μm) are present between the tops 4a of the foil sheets 4 positioned most distant from a center of the journal shaft 2, and the bearing holding member 3, and a viscoelastic body 6 is also filled in the gaps C1. That is, the foil sheets 4 are not put in a state of being constrained by the bearing holding member 3. In addition, materials for the foil sheets 4 and the viscoelastic body 6 are the same as those in the first embodiment. Further, the foil hydrodynamic journal bearing 1, according to the second embodiment, constructed in a manner described above is the same in operation as that according to the first embodiment.

The foil hydrodynamic journal bearing 1 shown in FIG. 7 constitutes a modification of the second embodiment to comprise three tops 4a and three bulged arcuate surfaces 4b, and is different from the second embodiment only in that the tops 4a are mounted and inserted into notched slits 7 formed in the bearing holding member 3 but is the same in operation as the second embodiment. Also, with this modification, the tops 4a may be mounted and inserted into the notched slits 7 in a state of being joined together by means of welding or an adhesive, or may be mounted and inserted into the notched slits 7 without joining of end sides of the foil sheets 4.

Figure 8:
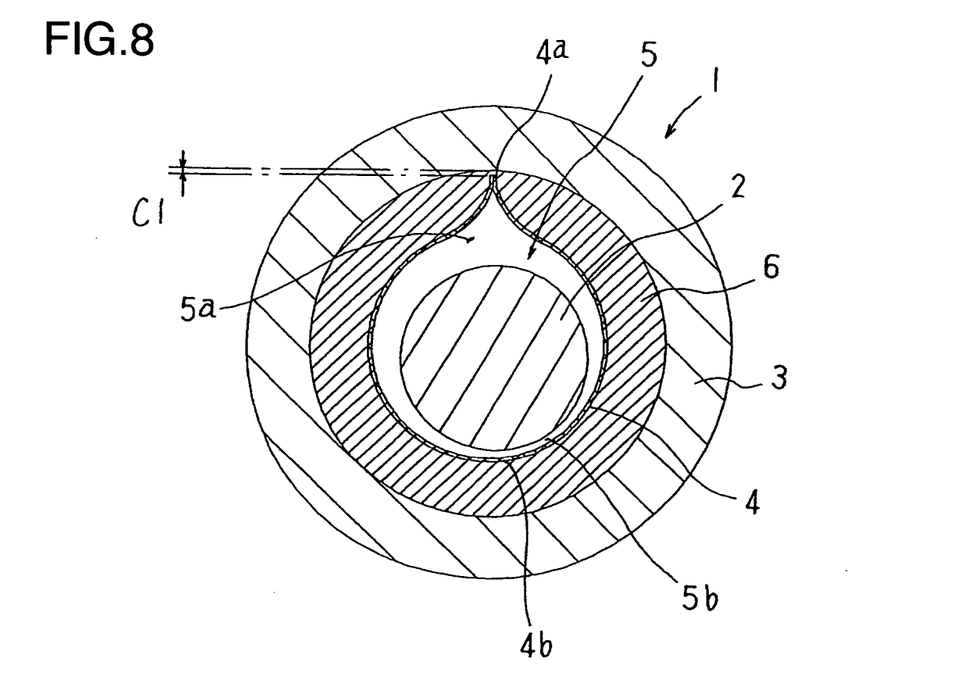
FIG. 8 is a cross sectional view showing a foil hydrodynamic journal bearing according to a third embodiment.
Figure 9:
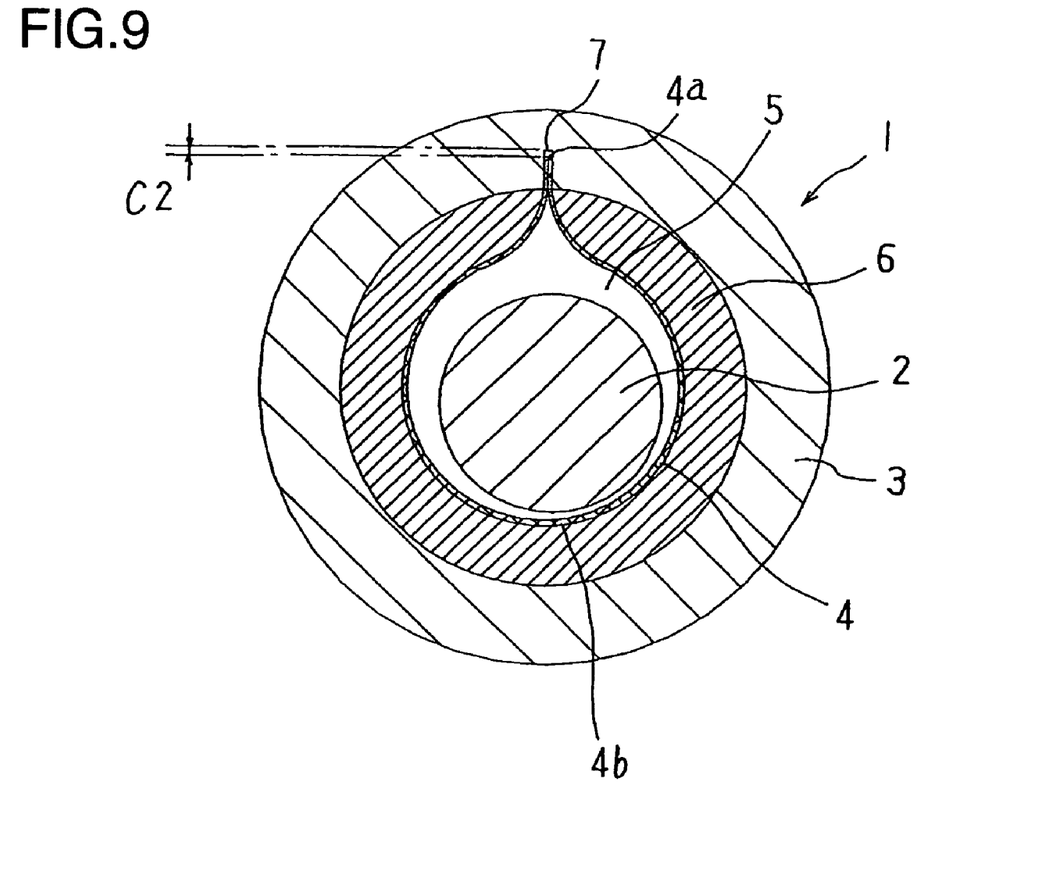
FIG. 9 is a cross sectional view showing a foil hydrodynamic journal bearing according to a modification of the third embodiment.

Furthermore, unlike the first embodiment shown in FIGS. 1 to 5 and the second embodiment shown in FIGS. 6 and 7, a foil hydrodynamic journal bearing 1 (referred below to as "third embodiment"), in which a top 4a and a bulged arcuate surface 4b, respectively, comprise a single foil sheet 4 as shown in FIGS. 8 and 9, will do. FIG. 8 is a cross sectional view showing a foil hydrodynamic journal bearing 1 according to a third embodiment, and FIG. 9 is a cross sectional view showing a modification of the third embodiment. The third embodiment will be simply described below. In addition, an explanation will be given below, in which the same members as those in the first embodiment are denoted by the same reference numerals as those in the latter.

The foil hydrodynamic journal bearing 1, according to the third embodiment, shown in FIG. 8 also comprises a bearing holding member 3 enclosing an outer periphery of a journal shaft 2 with an air gap therebetween, a foil sheet 4 arranged in the air gap to constitute a bearing sliding surface opposed to the journal shaft 2, and a viscoelastic body 6 filled in the air gap between the bearing holding member 3 and the foil sheet 4.

The foil sheet 4 is structured as a closed loop having a single top 4a and a single bulged arcuate surface 4b. That is, the foil sheet 4 is formed by overlapping both end sides of a single flat rectangular sheet together, joining the both end sides together as by welding such as spot, seam, laser, or the like, or means such as adhesives, brazing, diffusion bonding, or the like, to provide a teardrop shape, and using an assembly jig 10, described later, to structure a closed loop having a single top 4a (the top being constituted by a joint) and a single bulged arcuate surface 4b. In this case, a gap C1 (several hundreds μm) is present between the top 4a of the foil sheet 4 positioned most distant from a center of the journal shaft 2, and the bearing holding member 3, and a viscoelastic body 6 is also filled in the gap C1. That is, the foil sheet 4 is not put in a state of being constrained by the bearing holding member 3. In addition, materials for the foil sheet 4 and the viscoelastic body 6 are the same as those in the first embodiment. Further, the foil hydrodynamic journal bearing 1, according to the third embodiment, constructed in a manner described above is the same in operation as that according to the first embodiment.

A foil hydrodynamic journal bearing 1 shown in FIG. 9 constitutes a modification of the third embodiment to comprise a single top 4a and a single bulged arcuate surface 4b, and is different from the third embodiment only in that the top 4a is mounted and inserted into a notched slit 7 formed in a bearing holding member 3 but is the same in operation as the third embodiment. Also, with this modification, the top 4a may be mounted and inserted into the notched slit 7 in a state of being joined together by means of welding or an adhesive, or may be mounted and inserted into the notched slit 7 without joining of end sides of a foil sheet 4.

In addition, that arrangement shown in FIG. 4, in which the flexible regions 20 positioned on the side of the gap 5a are smaller in elastic modulus than the less flexible regions 21 positioned on the side of the gap 5b, and that arrangement shown in FIG. 5, in which the two top foil sheets 30 are provided between the foil sheets 4 and the journal shaft 2, are applicable also to the second embodiment and the third embodiment, respectively, shown in FIGS. 6 to 9.

Figures 10A, 10B, 10C:
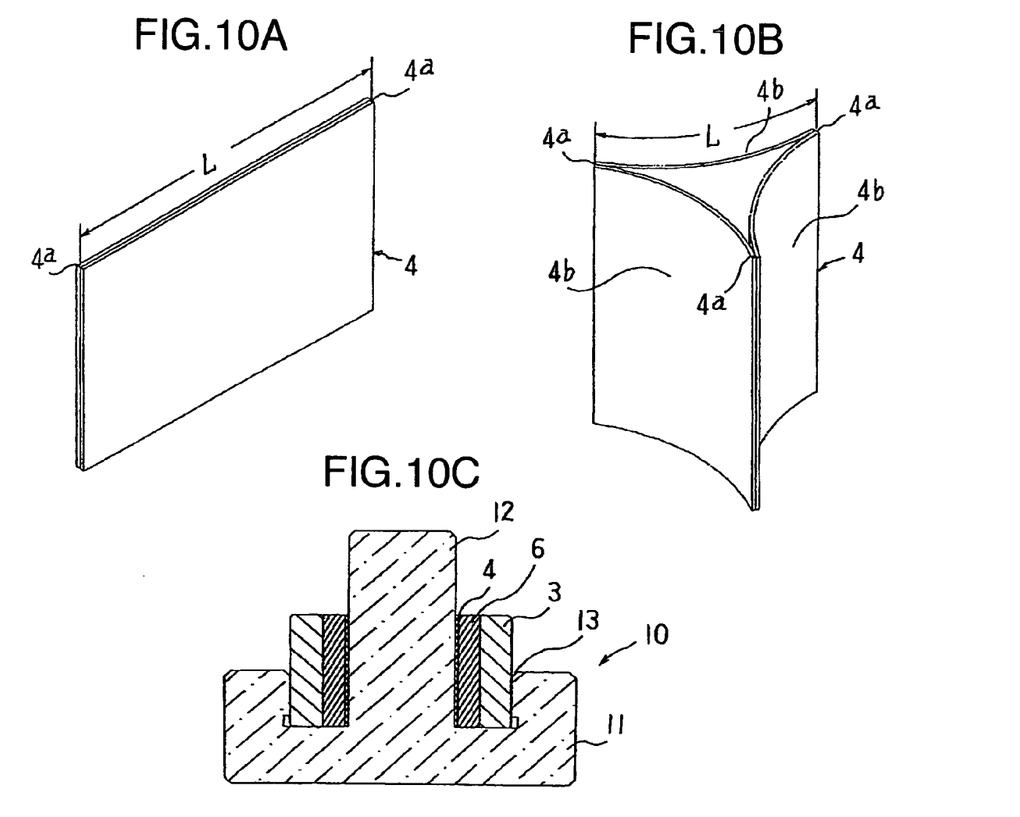
FIG. 10A to 10E are views illustrating a method of manufacturing a foil hydrodynamic journal bearing.

A method of manufacturing the foil hydrodynamic journal bearing 1 according to the embodiments will be described with reference to FIGS. 10A to 10E. In FIGS. 10A to 10E, an explanation will be given to the case where the foil hydrodynamic journal bearings 1 according to the first embodiment and the second embodiment are manufactured. FIGS. 10A and 10B show foil sheets 4, according to the first embodiment and the second embodiment, comprising two and three bulged arcuate surfaces, respectively. With two arcuate surfaces shown in FIG. 10A, two foil sheets 4 are joined at ends thereof to form the foil sheets 4 in the form of a closed loop. Joining is achieved by welding such as spot, laser, or the like, and an adhesive. A length L of the foil sheets is determined on the basis of a shaft diameter of a rotating equipment under application, a predetermined gap, a length of joints, or the like. In case of two arcuate surfaces, a state, in which two flat surfaces are brought into close contact with each other at both ends, comes out after joining. FIG. 10B shows the case of three arcuate surfaces, and a closed loop formed with three tops 4a and arcuate surfaces 4b, which are concave in shape as viewed from a side of a shaft, is provided after respective end sides of three foil sheets 4 are joined together.

An assembly jig 10 shown in FIG. 10C is used to assemble the foil sheets 4 constituted in a manner described above to a bearing holding member 3 to fabricate a foil hydrodynamic journal bearing 1. The assembly jig 10 comprises a shaft column 12 provided upright centrally of a base board 11, on which a positioning recess 13 corresponding to an external size of the bearing holding member 3 is formed, the shaft column copying the journal shaft 2.

Figure 10D:
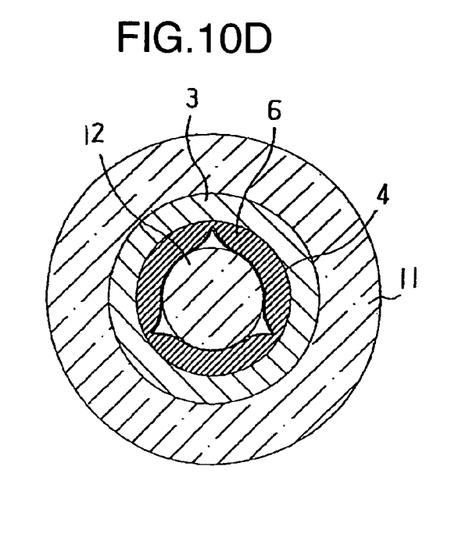
Figure 10E:
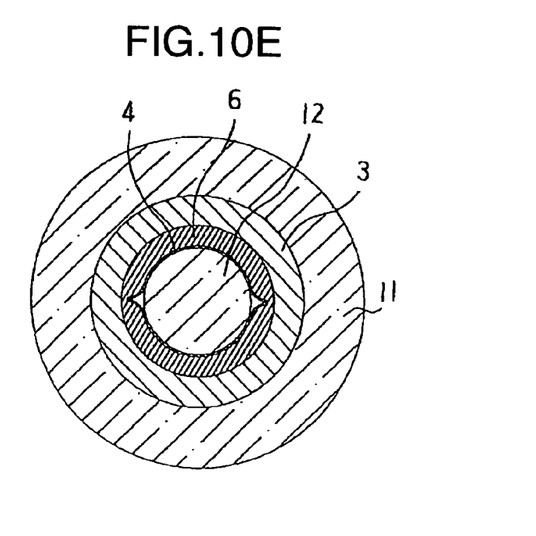

First, the shaft column 12 is caused to extend through an inner loop space in the foil sheets 4 of the closed loop to form bulged arcuate surfaces 4b. While the shaft column 12 copying the journal shaft 2 has substantially the same diameter as that of the journal shaft 2 under application, it is desired that the shaft column have a diameter, which affords formation of a predetermined bearing gap 5. Subsequently, as shown in FIGS. 10C to 10E, a bearing holding member 3 is mounted in the recess 13 on the base board 11, and then an appropriate quantity of a viscoelastic body 6 (or an elastic body) is filled in an air gap between the foil sheets 4 and the bearing holding member 3 to be dried. By being removed from the assembly jig 10 after drying, a foil hydrodynamic journal bearing 1 can be completed.

As described above, the invention can provide a manufacturing method, which is simple in manufacture and assembly of foil sheets 4. It can manufacture a foil hydrodynamic journal bearing of exceedingly high accuracy, and is suited to mass production. In the method a foil hydrodynamic journal bearing 1 can be manufactured only by mounting foil sheets 4 of a closed loop, which is formed by joining overlapped end sides of flat sheets 4 by welding or an adhesive, and includes a single or a plurality of tops 4a and surfaces 4b corresponding in number to the tops 4a, and a bearing holding member 3 on an assembly jig 10, filling a viscoelastic body 6 (or an elastic body) into an air gap between the foil sheets 4 and the bearing holding member 3, thereafter drying the viscoelastic body, and removing the foil hydrodynamic journal bearing 1 from the assembly jig 10.

In addition, when the rotating speed of the journal shaft 2 is increased to, for example, 50,000 rpm or higher, the foil sheets 4 themselves begin to vibrate like a membrane sometimes although being small in mass. As a result, a situation is sometimes brought about, in which the journal shaft 2 generates unstable vibrations, or the journal shaft 2 and the foil sheets 4 contact with each other in a state of high-speed rotation to cause seizure. For the purpose of preventing the foil sheets 4 from generating such vibration of membrane, that treatment is given, in which the foil sheets 4 are brought into close contact with the filled viscoelastic body 6 in an adhesive or bonded state. Concretely, in order to prevent the viscoelastic body 6 (or an elastic body) and the foil sheets 4 from peeling off from each other, a pretreatment for enhancement of an adhesive capacity between the viscoelastic body 6 (or an elastic body) and the foil sheets 4 is beforehand given to outer peripheral surfaces of the foil sheets 4 prior to filling of the viscoelastic body 6 (or an elastic body) whereby the foil sheets 4 are prevented from peeling off from the viscoelastic body 6 (or an elastic body).

Also, in order to prevent a trouble, in which the journal shaft and the viscoelastic body 6 (TSE Series, manufactured by GE Toshiba Silicone Ltd.) filled into the air gap between the foil sheets 4 and the bearing holding member 3 rotate along with each other, there is a need of enhancing an adhesive capacity between the bearing holding member 3 and the viscoelastic body 6. Therefore, in the same manner as described above, a pretreatment for enhancement of an adhesive capacity between the viscoelastic body 6 and the bearing holding member 3 is beforehand given to an inner peripheral surface of the bearing holding member 3 prior to filling of the viscoelastic body 6. Such pretreatment includes, for example, a treatment, in which adhesiveness of the viscoelastic body 6 (TSE Series, manufactured by GE Toshiba Silicone Ltd.) to the bearing holding member 3 is enhanced by coating a pretreatment agent (ME121, manufactured by GE Toshiba Silicone Ltd.) called primer on the bearing holding member 3 and drying the same before filling of the viscoelastic body 6 (TSE Series, manufactured by GE Toshiba Silicone Ltd.) into the air gap between the foil sheets 4 and the bearing holding member 3, or the like.

Furthermore, since the journal shaft 2 comes into solid contact with surfaces of the foil sheets 4 at the time of starting, stoppage, or low-speed rotation, there is a need of decreasing friction and wear between the foil sheets 4 and the journal shaft 2. Therefore, it is desired that chrome plating having an excellent wear characteristics, a hard film of DLC (diamond-like carbon), and a coating of a solid lubricant such as PTFE (polytetrafluoroethylene), $MoS_2$ (molybdenum disulphide), etc. be applied to at least one of the outer periphery of the journal shaft 2 and inner peripheral surfaces of the foil sheets 4. $WS_2$ film as a hard film, a mixture of PTFE and $MoS_2$, and a coating agent having a lubricating characteristic can be used besides. Also, coating of PFPE (perfluoropolyether), etc. to a thickness of several nanometer is effective as a lubricant.

Figure 11A:
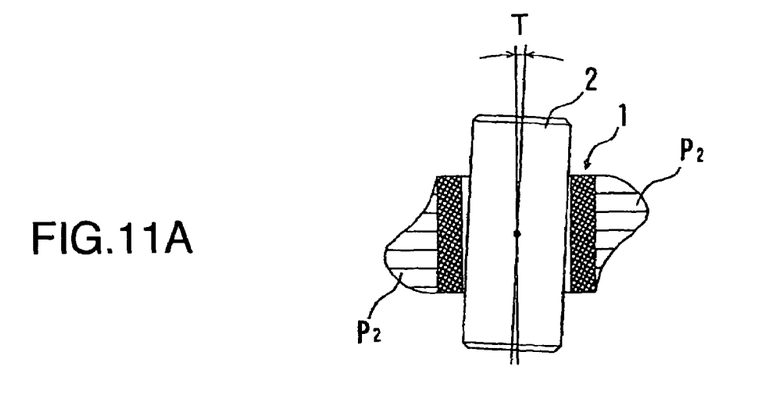
FIGS. 11A to 11C are schematic views showing pressure distributions generated on foil hydrodynamic journal bearings, when a journal shaft tilts in rotation.

In addition, an axis of the journal shaft 2 rotates eccentrically due to an unbalance load and swinging movements are sometimes caused due to tilting of the axis under the action of a moment load. In the case where the journal shaft 2 is supported by a single foil hydrodynamic journal bearing 1, when the journal shaft 2 tilts as shown in FIG. 11A, a large pressure is generated in the vicinity of a center of the foil hydrodynamic journal bearing 1 in an axial direction, so that there is produced a pressure distribution $P_2$ of the foil hydrodynamic journal bearing 1 in a manner shown in FIG. 11A whereby a bearing moment load found from the product of a distance from the center of the bearing and the pressure distribution is decreased, and so it is not sufficient to restrict tilting T of the journal shaft 2.

Figure 11B:
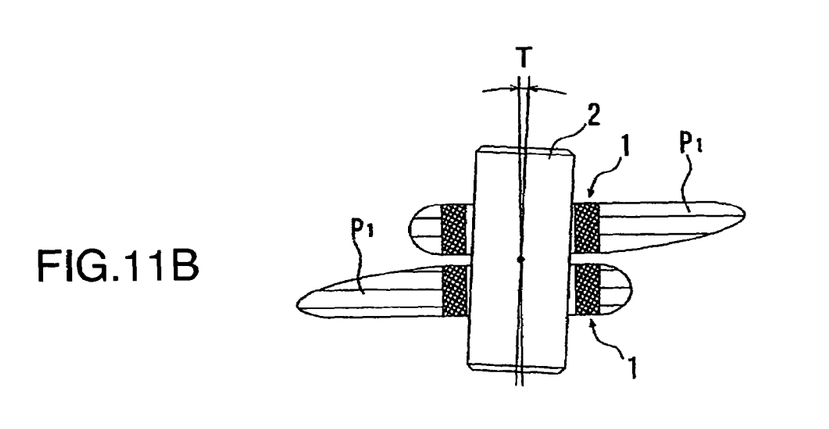

In contrast, in the case where a foil hydrodynamic journal bearing 1 is divided into two sections and foil hydrodynamic journal bearings 1 used in two rows support the journal shaft 2, when the journal shaft 2 tilts as shown in FIG. 11B, pressures generated on the respective foil hydrodynamic journal bearings 1 are away from centers of the foil hydrodynamic journal bearings 1 in an axial direction, so that there is produced a pressure distributions $P_1$ of the foil hydrodynamic journal bearings 1 in a manner shown in FIG. 11B whereby bearing moment loads found from the products of distances from the centers of the bearings and the pressure distributions are increased, and so it is improved to restrict tilting T of the journal shaft 2.

Figure 11C:
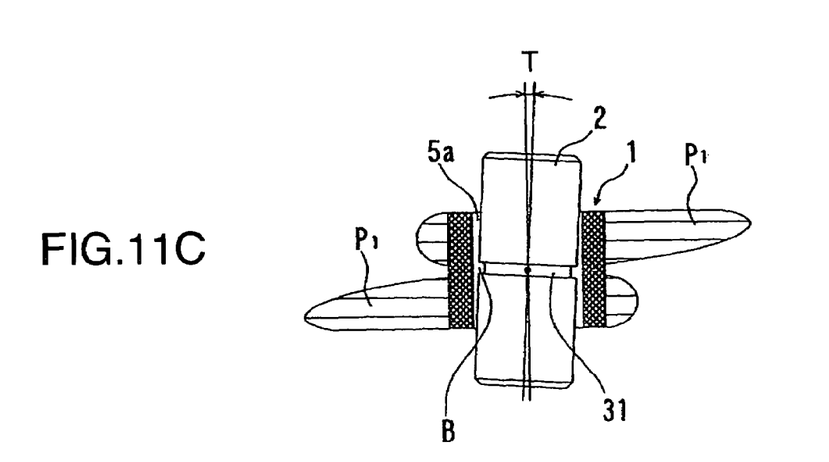

Hereupon, according to the embodiment, a shaft groove 31 is formed circumferentially on that surface of a journal shaft 2, which is opposed to the bearing sliding surface, to be communicated to the outside air through a gap 5a formed in the vicinity of the tops 4a. Thereby, in the case where the journal shaft 2 formed with such shaft groove 31 is supported by a single foil hydrodynamic journal bearing 1, even when the journal shaft 2 tilts as shown in FIG. 1C, pressure as generated is divided by the shaft groove 31 to become the same as that at ends of the foil hydrodynamic journal bearing 1 to present such pressure distributions $P_1$ as that in case of using a plurality of foil hydrodynamic journal bearings 1 since the shaft groove 31 is communicated to the outside air through the gap 5a. Thereby, a bearing moment load found from the product of a distance from the center of the bearing and the pressure distribution is increased, and so it is improved to restrict tilting T of the journal shaft 2.

In addition, while formation of a single shaft groove 31 is shown in FIG. 11C, it is not limitative but a plurality of shaft grooves 31 may be formed.

The foil hydrodynamic journal bearing 1 according to the invention has a feature in that the bearing gap 5 can be set to a small magnitude with accuracy and the quality of mass production is excellent also for bearings having a shaft diameter of the order of 10 mm or less. Owing to such feature, it is possible to remove disadvantages such as generation of leakage and mist of a lubricating oil, irregular vibrations caused by occurrence of cavitation, an increase in bearing loss (power consumption), etc., which are problematic in a region of high-speed rotation when gases such as an air are used for a lubricating fluid. Thereby, it is possible to realize rotation of high accuracy and a clean environment, so that the foil hydrodynamic journal bearing 1 according to the invention is suited to application as bearings for hard-disk drive motors, polygon mirror scanner motors, or color-wheel motors for rear projection televisions. In addition, while the foil hydrodynamic journal bearing 1 according to the invention has been described with respect to the case where a lubricating fluid is mainly composed of gases, the invention is also applicable to the case where a lubricating fluid is composed of aqua or oil liquids. Also, while the foil hydrodynamic journal bearing 1 according to the invention is preferred as bearings having a shaft diameter of the order of 10 mm or less, it is of course applicable to bearings having a shaft diameter having a large shaft diameter (for example, 50 mm).

In addition, while the embodiments have been described with respect to the case where the journal shaft 2 rotates, and the foil sheets 4, which define bearing sliding surfaces, the viscoelastic body 6 (or an elastic body), and the bearing holding member 3 are stationary, the foil hydrodynamic journal bearing 1 according to the invention can conform to the case where the journal shaft 2 is stationary, and the foil sheets 4, the viscoelastic body 6 (or an elastic body), and the bearing holding member 3 rotate.

The invention claimed is:

1. A foil hydrodynamic journal bearing comprising a bearing holding member enclosing an outer periphery of a journal shaft with an air gap therebetween, and a foil sheet arranged in the air gap to constitute a bearing sliding surface opposed to the journal shaft, wherein a fluid lubricating film formed by relative rotation between the journal shaft and the bearing sliding surface supports a load acting on the journal shaft;
the foil sheet comprises a closed loop including one or plural tops and bulged arcuate surfaces corresponding in number to the tops; and a viscoelastic body or an elastic body is filled in the air gap between the foil sheet and the bearing holding member.

2. The foil hydrodynamic journal bearing according to claim 1, wherein the foil sheet is arranged in the air gap and the viscoelastic body or the elastic body is filled so as to prevent direct contact between the top or tops of the foil sheet and an inner peripheral surface of the bearing holding member.

3. The foil hydrodynamic journal bearing according to claim 2, wherein an elastic region positioned on a fluid inlet side, through which a fluid constituting the fluid lubricating film is drawn into a gap between the journal shaft and the bearing sliding surface and which is formed by the viscoelastic body or the elastic body, is smaller in elastic modulus than an elastic region positioned on a fluid outlet side, from which the drawn fluid is discharged and which is formed by the viscoelastic body or the elastic body.

4. The foil hydrodynamic journal bearing according to claim 2, wherein a top foil sheet or sheets corresponding in number to the tops are arranged between the foil sheet and the journal shaft, and the top foil sheet or sheets have one end or ends thereof formed as a fixed end or ends fixed to the top or tops of the foil sheet and the other end or ends thereof formed as a free end or ends not fixed so as to surround the journal shaft in the same direction as a direction of rotation of the journal shaft.

5. The foil hydrodynamic journal bearing according to claim 2, wherein a single or plural shaft grooves are formed circumferentially on a surface of the journal shaft opposed to the bearing sliding surface, and the single or plural shaft grooves are communicated to the outside air through a gap formed in the vicinity of the top or tops.

6. The foil hydrodynamic journal bearing according to claim 1, further comprising a notch slit formed in the bearing holding member and wherein the top or tops of the foil sheet are inserted into the notch slit, and the foil sheet is arranged in the air gap and the viscoelastic body or the elastic body is filled so as to prevent direct contact between the top or tops of the foil sheet and a bottom surface of the notch slit.

7. The foil hydrodynamic journal bearing according to claim 6, wherein an elastic region positioned on a fluid inlet side, through which a fluid constituting the fluid lubricating film is drawn into a gap between the journal shaft and the bearing sliding surface and which is formed by the viscoelastic body or the elastic body, is smaller in elastic modulus than an elastic region positioned on a fluid outlet side, from which the drawn fluid is discharged and which is formed by the viscoelastic body or the elastic body.

8. The foil hydrodynamic journal bearing according to claim 6, wherein a top foil sheet or sheets corresponding in number to the tops are arranged between the foil sheet and the journal shaft, and the top foil sheet or sheets have one end or ends thereof formed as a fixed end or ends fixed to the top or tops of the foil sheet and the other end or ends thereof formed as a free end or ends not fixed so as to surround the journal shaft in the same direction as a direction of rotation of the journal shaft.

9. The foil hydrodynamic journal bearing according to claim 6, wherein a single or plural shaft grooves are formed circumferentially on a surface of the journal shaft opposed to the bearing sliding surface, and the single or plural shaft grooves are communicated to the outside air through a gap formed in the vicinity of the top or tops.

10. The foil hydrodynamic journal bearing according to claim 1, wherein an elastic region positioned on a fluid inlet side, through which a fluid constituting the fluid lubricating film is drawn into a gap between the journal shaft and the bearing sliding surface and which is formed by the viscoelastic body or the elastic body, is smaller in elastic modulus than an elastic region positioned on a fluid outlet side, from which the drawn fluid is discharged and which is formed by the viscoelastic body or the elastic body.

11. The foil hydrodynamic journal bearing according to claim 1, wherein a top foil sheet or sheets corresponding in number to the tops are arranged between the foil sheet and the journal shaft, and the top foil sheet or sheets have one end or ends thereof formed as a fixed end or ends fixed to the top or tops of the foil sheet and the other end or ends thereof formed as a free end or ends not fixed so as to surround the journal shaft in the same direction as a direction of rotation of the journal shaft.

12. The foil hydrodynamic journal bearing according to claims 1, wherein a single or plural shaft grooves are formed circumferentially on a surface of the journal shaft opposed to the bearing sliding surface, and the single or plural shaft grooves are communicated to the outside air through a gap formed in the vicinity of the top or tops.

13. A method of manufacturing a foil hydrodynamic journal bearing, which comprises a bearing holding member enclosing an outer periphery of a journal shaft with an air gap therebetween, a foil sheet arranged in the air gap to constitute a bearing sliding surface opposed to the journal shaft, and in which a fluid lubricating film formed by relative rotation between the journal shaft and the bearing sliding surface supports a load acting on the journal shaft, the method comprising:

a first step of joining overlapped end sides of one or plural flat sheets together to manufacture the foil sheet of a closed loop having one or plural tops and a surface or surfaces corresponding in number to the tops;

a second step of using an assembly jig, which comprises a shaft column copying the journal shaft and provided upright centrally of a base board, on which positioning means corresponding in external size to the bearing holding member is formed, to insert the shaft column through an inner loop space defined by the foil sheet of a closed loop, which is manufactured in the first step, to form a bulged arcuate surface;

a third step of mounting and inserting the bearing holding member into the positioning means on the base board of the assembly jig;

a fourth step of filling a viscoelastic body or an elastic body in the air gap between the foil sheet and the bearing holding member to dry the same; and a fifth step of removing the foil hydrodynamic journal bearing from the assembly jig.

* * * * *